July 21, 1964 — J. BOEHM — 3,141,340
GRAVITY DEVICE
Filed Dec. 15, 1961

JOSEF BOEHM,
INVENTOR.

BY
ATTORNEYS

United States Patent Office 3,141,340
Patented July 21, 1964

3,141,340
GRAVITY DEVICE
Josef Boehm, Huntsville, Ala., assignor to the United States of America as represented by the Administrator of the National Aeronautics and Space Administration
Filed Dec. 15, 1961, Ser. No. 159,804
3 Claims. (Cl. 73—517)
(Granted under Title 35, U.S. Code (1952), sec. 266)

The invention described herein may be manufactured and used by or for the Government of the United States of America for governmental purposes without the payment of any royalties thereon or therefor.

The present invention relates to a gravity device and more particularly to a gravity device utilizing a free falling body.

The study of instrumentation, components, and the like under the hostile conditions found in outer space has resulted in the construction and planned construction of large vertical accelerators, such as illustrated in application S.N. 784,006 of Adolf L. Herrmann, filed December 30, 1958, now Patent No. 3,014,360, which have a carrier subject to linear acceleration along a path radial to the center of mass of the earth. The carrier, which supports equipment to be tested, is cyclically accelerated to and fro along the radial path whereby desired gravity loadings on the equipment may be reproduced.

The acceleration of the carrier downward toward the center of mass of the earth will simulate zero-gravity or weightless loadings upon the equipment when its acceleration is equal to the local gravitational acceleration usually designated by the symbol "g" and sometimes called the gravitational constant. As the equipment to be tested must function properly under zero-gravity conditions, it must accurately be determined that zero-gravity conditions have actually been achieved by the carrier as it moves toward the earth's center of mass.

Heretofore, instruments and devices capable of detecting small gravity loadings have been intricate and fragile constructions which were easily damaged by the rapid accelerations and decelerations of the carrier during its cyclic operation. Further, these prior instruments, particularly the torsional balance type and the simple pendulum type, have required readings over prolonged periods of observation to obtain a reliable average of the gravity loading being experienced and such readings were not feasible in the short time the carrier traveled from the top of the accelerator to the bottom.

Accordingly, it is an object of the present invention to provide a sturdy gravity device of easily constructed parts capable of operating under repeated and rapid accelerations and decelerations.

Another object is to provide a gravity device which will give an accurate and rapid indication of relative gravity conditions aboard an accelerating carrier.

Other and further objects, uses, and advantages of the invention will become apparent as the description proceeds.

In accordance with the present invention, a gravity device is constructed having an elongated passageway and a ball therein which is adapted to accelerate undisturbed within the passageway in response to gravitational force. The device also includes a light source and photoelectric cell means for detecting the exact position of the ball within the elongated passageway. To make certain where the initial position of the ball is located, an electromagnet is provided in one example at an end of the elongated passageway and in another example midway of the length of the passageway.

The gravity device is fixed to a carrier, adapted to accelerate along a path toward a gravitational center, whereby the longitudinal axis of its elongated passageway is approximately parallel with the longitudinal axis of the path the carrier is adapted to move along. Accordingly, any displacement of the ball from its initial position within the passageway will represent the difference between the carrier's acceleration and the gravitational acceleration which achieves zero-gravity conditions aboard the carrier as it moves toward the gravitational center.

This will be more readily understood by the following detailed description when taken together with the accompanying drawings in which.

Figure 1:
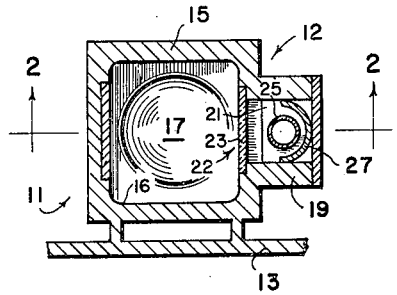
FIGURE 1 is a plan cross-sectional view of a gravity device attached to a carrier, with portions of the carrier removed.
Figure 2:
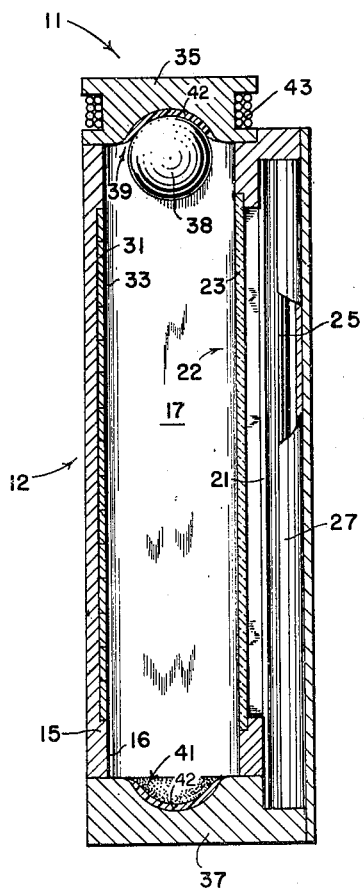
FIGURE 2 is an elevational cross-sectional view taken along line 2—2 of FIGURE 1, with portions broken away.

Referring now to the drawings and to FIGURES 1 and 2 in particular, a gravity device 11 is shown mounted on a carrier 13 which is subject to acceleration, at approximately the earth's surface, along a path radial to the earth's center of mass. For purposes of this description the earth's center of mass is also considered to be its gravitational center. The gravity device 11 has a housing 12 consisting of an elongated tubular portion 15 having an inner peripheral surface 16 defining the outer limits of an elongated passageway 17, and a channel portion 19 integral with the tubular portion 15 which defines a narrow recess 21 having an elongated finite opening 22 extending through the inner surface 16 of the tubular portion 15. The longitudinal axes of the passageway 17 and the recess 21 as well as its opening 22 are parallel. A translucent panel 23 fits within the recess opening 22 and has its inner surface, which faces the passageway 17, flush with the inner surface 16 of the elongated tubular portion 15.

Within the recess 21 is mounted a suitable light source which is shown as a fluorescent lamp 25 having a curved reflector 27 for directing the light of the fluorescent lamp 25 through the translucent panel 23 toward the portion of the inner surface 16 directly opposite the translucent panel 23.

Along this portion of the inner surface 16 opposite the translucent panel 23 is a series of photoelectric cells 31 of the self-generating type which have an electrical current output when light strikes their light sensitive surfaces 33. As shown, the light sensitive surfaces 33 are flush with the inner surface 16 and face the elongated passageway 17.

One end of the tubular portion 15 is sealed by a top member 35 and the other end is sealed by a base member 37 and its elongated passageway 17 is exhausted of air so a near vacuum exists. Within and confined by the elongated passageway 17 is a ball 38 or some other similar body which is free to move from one end of the elongated passageway 17 to the other. The top member 35 is provided with a shallow recess 39 on its surface facing the passageway 17 and the base member 37 is also provided with a recess 41 on its surface facing the passageway 17 and each recess 39 or 41 is adapted to receive and seat the ball 38. Both recesses 39 and 41 are provided with a cushion layer 42 of nylon or the like for reducing the shock of the ball 38 striking therein.

The top member 35 is designed to hold the ball 38 stationary within the top recess 39 by magnetic force before the start of the carrier 13 toward the earth's gravitational center, and for this purpose, the top member 35 is made of magnetic material and is surrounded by a coil of wire 43 as any conventional electromagnet, and the ball 38 is made of a magnetic material or a composite including a magnetic material. Thus when electrical current passes through the coil of wire 43, the top member 35 will become magnetized so that the ball 38 may be magnetically held within the top recess 39 and later quickly released by merely interrupting the electrical current flow through the wire 43.

The series of photoelectric cells 31 are aligned and located between the top member 35 and the base member 37 but spatially to each member 35 and 37 whereby when the ball 38 is received within one of the recesses 39 or 41 it will not disturb the light from the fluorescent lamp 25 from striking the light sensitive surfaces 33 of the photoelectric cells 31, and whereby when the ball 38 is displaced from one of the recesses 39 or 41 it will come between the fluorescent lamp 25 and a part of the photoelectric cells 31 and thereby cast a shadow on a part of the photoelectric cells 31 and disrupt their electrical current output.

Figure 3:
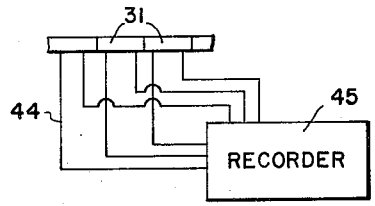
FIGURE 3 is a partial schematic wiring diagram.

The partial schematic wiring diagram shown in FIGURE 3 illustrates the direct wiring 44 from each photoelectric cell 31 to a recorder 45 which records the time of the variation in each cell's electrical output. Thus, when the ball 38 is released from the top member 35 and accelerates toward the base member 37 it will cast a shadow upon the photoelectric cells 31 in sequence causing a disturbance in each photoelectric cell's electrical current output at the instant the ball becomes between the photoelectric cell 31 and the fluorescent lamp 25. Because the position of each photoelectric cell 31 is fixed and the time of the disturbance of the electrical current from each photoelectric cell 31 is recorded by the recorder 45, sufficient data are obtained to give an accurate determination of the ball's acceleration relative to the elongated passageway 17 and to the carrier 13. While it is apparent that the number of photoelectric cells 31 per unit of length of the elongated passageway 17 may vary. Increased accuracy in determining the position of the ball 38 is obtained as the number of photoelectric cells 31 per unit of length of the elongated passageway 17 increases.

In operation, the gravity device 11 is positioned on the carrier 13 so that the longitudinal axis of its elongated passageway 17 is approximately parallel with the longitudinal axis of the acceleration path of the carrier 13 toward the earth's gravitational center and so that its base member 37 faces downward toward the earth's gravitational center. The ball 38 is then placed within the recess 39 of the top member 35 and held there by magnetic force, as described hereinbefore, while the carrier 13 is positioned for its downward acceleration toward the earth's gravitational center.

At the instant the carrier 13 is released to follow the earth's gravitational pull, the ball 38 is released from the top member 35 by interrupting the flow of current in wire 43 by conventional circuitry (not shown). Thus as the carrier 13 accelerates toward the earth's gravitational center, the ball 13 will also be accelerating in a free fall within the elongated passageway 17 at a rate equal to the local gravitational acceleration, because it will not be subject to disturbances like air friction.

It is to be noted however, that since the housing 12 is fastened or integrally a part of the carrier 13, the housing 12 will also have an acceleration equal to the carrier's acceleration. Accordingly, any displacement of the ball 38 from its initial position, which is the top recess 39, will represent the difference between the carrier's acceleration and the gravitational acceleration which achieves zero-gravity or weightless conditions. This displacement of the ball 38 from the top member 38 is detected, as explained hereinbefore, by the photoelectric cells 31 which transmit an electrical signal to the recorder 45 whereby the position of the ball 38 will be known. It is apparent that any acceleration of the carrier greater than the local gravitational acceleration will not be detected by this particular gravity device 11; therefore, if the carrier 13 is subject to accelerations larger than the local gravitational acceleration another gravity device 51, as explained hereinafter, should be used.

Figure 4:
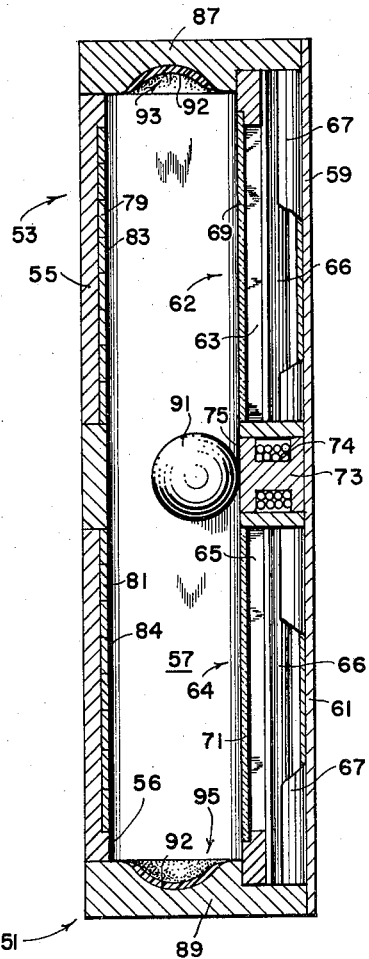
FIGURE 4 is an elevational cross-sectional view, similar to FIGURE 2, of another gravity device, with portions broken away.

The other gravity device 51 is illustrated in FIGURE 4. It consists essentially of a housing 53 having an elongated tubular portion 55 with an inner peripheral surface 56 defining the outer limits of an elongated passageway 57, and two spaced channel portions, an upper portion 59 and a lower portion 61, integral with the tubular portion 55. Upper channel portion 59 defines an upper narrow recess 63 having an elongated finite opening 62 extending through the inner surface 56 of the tubular portion 55, and lower channel portion 61 defines a lower narrow recess 65 having an elongated finite opening 64 also extending through the inner surface 56 of the tubular portion 55. The longitudinal axes of the passageway 57 and the recesses 63 and 65 as well as their openings 62 and 64 are parallel.

Translucent panels 69 and 71 fit within the respective recess openings 62 and 64 and have their inner surfaces, which face the passageway 57, flush with the inner surface 56 of the tubular portion 55. The recesses 63 and 65 each have a light source mounted therein consisting of a fluorescent lamp 66 and a curved reflector 67 for directing the light toward the portion of the inner surface 56 opposite the two translucent panels 69 and 71.

Midway of the elongated passageway 57 and contiguous to the two channel portions 59 and 61 is a conventional electromagnet 73 having a surface 75 facing the elongated passageway 57 and flush with the inner surface 56 of the elongated tubular portion 57. The electromagnet 73 consists of a magnetic material core, steel for example, surrounded by a coil of wire 74.

Along the inner surface 56 directly opposite the translucent panels 69 and 71 are two spaced series of photoelectric cells, upper series 79 and lower series 81, of the self generating type, having their light sensitive surfaces 83 and 84, respectively, flush with the inner surface 56 and facing the elongated passageway 57. The tubular portion 55 is sealed at one end by a top member 87 and at the other end by a base member 89 and its elongated passageway 57 is exhausted of air so a near vacuum exists. Within and confined by the elongated passageway 57 is a ball 91, similar to ball 38 of gravity device 11 which is free to move from one end of the elongated passageway 57 to the other. The top member 87 is provided with a shallow recess 93 on its surface facing the elongated passageway 57 and the base member 89 is provided with a similar recess 95 on its surface facing the elongated passageway 57. Each recess 93 and 95 is adapted to act as a seat for the ball 91 and, therefore, has a cushion layer 92 of nylon or the like for reducing the shock of the ball 91 striking therein.

The two series of photoelectric cells 79 and 81 are spaced apart a distance equal to the diameter of the ball 91, whereby when the ball 91 is held by the electromagnet 75 it will not disturb the light emitted by fluorescent lamps 66 from striking the light sensitive surfaces 83 and 84 of the photoelectric cells 79 and 81. As noted before, each series of photoelectric cells 79 and 81 are directly across from the translucent panels 69 and 71, respectively, therefore, the translucent panels 69 and 71 are also spaced apart a distance equal to the diameter of the ball 91.

The partial schematic wiring diagram shown in FIGURE 3 and previously described also may be used for the gravity device 51 to record the electrical disturbance of each photoelectric cell in the two series 79 and 81 caused by the ball 91 coming between one of the translucent panels 69 and 71 and a part of one of the series of photoelectric cells 79 and 81.

In operation, the gravity device 51 is also similar to the first described gravity device 11. The ball 91 is initially held by magnetic force to the electromagnet 73 when the carrier 13 is positioned for its downward acceleration toward the earth's gravitational center. At the instant the carrier 13 starts its downward acceleration, the ball 91 is released from the electromagnet 73 by interrupting the flow of current in wire 74 by conventional circuitry (not shown).

At this time, if the carrier 13 has an acceleration less than the gravitational acceleration, the ball 91 will have a relative free fall acceleration down the elongated passageway 57 toward the base member 89 similarly to the described gravity device 11; but if the carrier 13 has an acceleration greater than the gravitational acceleration, the ball 91 will have a relative free fall acceleration up the elongated passageway 57 toward the top member 87. The acceleration and the position of the ball 91 being determined similarly to ball 38 of the described gravity device 11 by the disturbance in each photoelectric cell's electrical output as the ball 91 sequentially disturbs the light striking each photoelectric cell's light sensitive surface 83 or 84.

It will be understood by those skilled in the art that the two described gravity devices 11 and 53 are similar in construction and operation. Each has a sealed elongated passageway in which a ball or other free body mass is adapted to accelerate in an undisturbed manner and a series of photoelectric cell means including a light source for detecting the exact position of the ball within the elongated passageway. Further, it has been demonstrated by the two described gravity devices 11 and 53 that the initial position of the ball may be varied with minor modifications.

While the gravity devices 11 and 53 have been specifically described in combination with a carrier 13, it is also apparent that they have separate utility in that they could be used to accurately measure deviations in the force of gravity at various locations on the surface of the earth.

Obviously, many modifications and variations of the present invention are possible in the light of the above teachings. It is, therefore, to be understood that within the scope of the appended claims, the invention may be practiced other than as specifically described.

What is claimed is:
1. In combination with a carrier adapted to accelerate from a starting position toward a gravitational center;
   (a) a gravity device having an elongated tubular portion with an inner peripheral surface defining an elongated passageway;
   (b) said gravity device being fixed to said carrier and the longitudinal axis of its elongated passageway being approximately parallel with the longitudinal axis of the path said carrier is adapted to accelerate along;
   (c) said elongated tubular portion having a top member sealing one end of said elongated passageway and a base member sealing the other end of said elongated passageway;
   (d) a body within and confined by said elongated passageway and adapted for longitudinal acceleration within said elongated passageway;
   (e) said passageway being exhausted of air whereby said body may accelerate in an undisturbed manner;
   (f) means for initially holding said body stationary within said elongated passageway when said carrier is placed in its starting position and for later releasing said body at the instant said carrier is adapted to start its acceleration from its starting position; and
   (g) means for detecting the relative displacement of said body from its initial stationary position at any instant whereby the gravitational conditions aboard said accelerating carrier may readily be determined.

2. In combination with a carrier accelerating along a path toward a gravitational center,
   (a) a gravity device having an elongated passageway;
   (b) said gravity device being fixed to said carrier and the longitudinal axis of its elongated passageway being approximately parallel with the longitudinal axis of the path said carrier is accelerating along;
   (c) a body made of magnetic material within said elongated passageway and adapted to move along the longitudinal axis of said elongated passageway;
   (d) means for initially mangetically holding said body stationary approximately midway of said elongated passageway and for later releasing said body for longitudinal movement within said elongated passageway; and
   (e) means for detecting at any instant movement of said body from its initial stationary position within said elongated passageway.

3. A gravity device, comprising:
   (a) a housing having an inner elongated passageway;
   (b) a body made of magnetic material within said elongated passageway and adapted for longitudinal movement within said elongated passageway;
   (c) means for initially magnetically holding said body stationary approximately midway of said elongated passageway and for later releasing said body for longitudinal movement within said elongated passageway;
   (d) a series of photoelectric cells supported within said housing along a longitudinal surface of said passageway; and
   (e) a light source supported by said housing adjacent a portion of said passageway opposite said series of photoelectric cells.

References Cited in the file of this patent

UNITED STATES PATENTS

| | | |
|---|---|---|
| 2,137,963 | Heiland | Nov. 22, 1938 |
| 2,641,458 | Gilvarry | June 9, 1953 |
| 2,816,279 | Stanton | Dec. 8, 1959 |
| 2,960,872 | Jones | Nov. 22, 1960 |
| 2,997,358 | Lefebvre | Aug. 22, 1961 |
| 3,014,360 | Herrmann | Dec. 26, 1961 |
| 3,027,767 | Slack | Apr. 3, 1962 |